United States Patent [19]

Hagiwara

[11] Patent Number: 4,679,143

[45] Date of Patent: Jul. 7, 1987

[54] CONTROL DEVICE FOR GAME MACHINE

[75] Inventor: Takashi Hagiwara, Zama, Japan

[73] Assignee: Sigma Enterprises, Inc., Tokyo, Japan

[21] Appl. No.: 540,677

[22] Filed: Oct. 11, 1983

[30] Foreign Application Priority Data

Nov. 29, 1982 [JP] Japan ................................ 57-208849

[51] Int. Cl.[4] ........................ G07F 17/34; A63F 5/04; A63F 7/00; G06F 15/44

[52] U.S. Cl. .................................... 364/412; 364/410; 273/138 A

[58] Field of Search ........................ 364/411, 412, 410; 273/138 A

[56] References Cited

U.S. PATENT DOCUMENTS 3,993,312 11/1976 Burnside ........................ 273/138 A
4,240,635 12/1980 Brown ............................ 273/138 A
4,373,723 2/1983 Brown et al. .................... 273/138 A
4,494,197 1/1985 Troy et al. .......................... 364/412

FOREIGN PATENT DOCUMENTS 2092796 8/1982 United Kingdom .
2096376 10/1982 United Kingdom .
2097570 11/1982 United Kingdom .

*Primary Examiner*—Jerry Smith
*Assistant Examiner*—Charles B. Meyer
*Attorney, Agent, or Firm*—Berman, Aisenberg & Platt

[57] ABSTRACT

An amusement device and method of operation are disclosed wherein a plurality of payout schedules which govern the conduct of the game are retained in a memory. The actual payout rate of the apparatus is constantly determined and the actual payout is compared with predetermined limits. If the actual payout exceeds the limit, the apparatus automatically selects another payout schedule which alters the probability of a player's winning. The game is fiar because the payout schedule governing conduct of the game is displayed to the player.

8 Claims, 3 Drawing Figures

CONTROL DEVICE FOR GAME MACHINE

FIELD OF THE INVENTION

This invention relates to the art of amusement devices, particularly devices which provide a game wherein a payout is based on random variations within a predetermined payout schedule.

BACKGROUND ART

Amusement devices which provide a game based on a random or pseudo-random number are known. For example, U.S. Pat. No. 4,240,365 (Brown) teaches an electronic slot machine. This apparatus includes a pseudo-random number generator which cooperates with a central processing unit to determine which of several objects will win a game. The slot machine shown by Brown employs a display similar to that of a mechanical slot machine so as to simulate the mechanical machine. The pseudo-random number generator is commercially available and is programmed by its manufacturer to provide a fixed payout ratio.

U.S. Pat. No. 4,373,723 (Brown et al.) shows an amusement device wherein horses or other objects traverse a path during the game. Each of the horses is powered by an electric motor, and an electronic control unit provides drive signals for each of the electric motors. A program card contains payout information, and this card may be replaced to vary the payout odds. Also, a stepper is provided to alter the odds in discrete steps.

It is also known to vary selected odds of a payout schedule during the early term of the operation of a machine. The owner, thus, will not suffer a large loss soon after installation of the machine. These machines are typically illegal since the alteration of the odds is not displayed.

SUMMARY OF THE INVENTION

The prior art devices suffer from the disadvantage that it is possible for large winnings to occur soon after installation of a machine, even though the long-term winnings have been set in accordance with a predetermined payout ratio. These large winnings soon after installation might cause financial difficulty to the owner of the machine since he may not be prepared to make large payouts soon after installation.

The apparatus according to the invention provides a plurality of payout schedules recorded in a memory device. Each of the payout schedules provides different payouts for winning. Some of these schedules provide large payouts so that the player of the machine is induced to continue playing the machine. Other schedules reduce the payout so that the owner of this machine receives more income. A memory device measures and records the actual payout ratio of the machine so that the current payout ratio, as opposed to the long-term payout ratio is known. The memory device which records the actual payout ratio is connected to a disposition circuit which is programmed to automatically select a payout schedule less favorable to the player when the actual payout exceeds a predetermined limit. In this way, the machine is operated so that the owner of the machine does not suffer large losses in the period soon after installation of the machine, and yet the machine is operated as much as possible to induce players to continue playing. This result occurs because the machine automatically varies the payout schedule to provide a schedule less favorable to the player only when the actual payout ratio exceeds a predetermined limit.

The apparatus of the invention includes a display to exhibit the payout schedule governing the disposition circuit so that the machine will comply with gaming laws by advising the player of changes in the payout schedule.

It is an object of this invention to provide an amusement apparatus having a variable payout schedule.

It is a further object of this invention to provide an amusement apparatus wherein the payout schedule is selected in accordance with the actual payout history of the apparatus.

It is a still further object of this invention to provide a gaming apparatus which discloses the payout schedule and which varies the payout schedule automatically in accordance with the actual payout history of the machine.

DETAILED DESCRIPTION OF THE INVENTION

Figure 1:
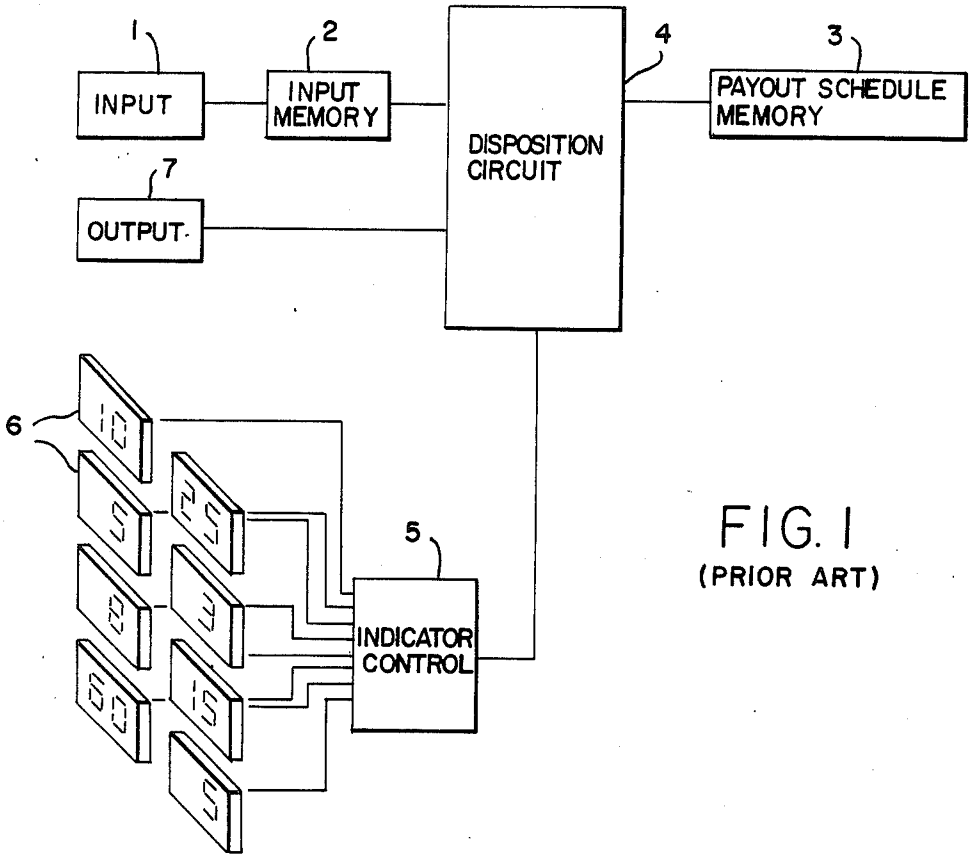
FIG. 1 (PRIOR ART)
FIG. 1 is a schematic of an apparatus in accordance with the prior art.

FIG. 1 is a schematic diagram of an amusement apparatus which is known in the prior art. An input device 1 receives an input from the player of the game. This input apparatus, for example, might be a keyboard having a plurality of keys each of which represents a particular object. The player selects an object and presses that key. The input 1 produces a signal which is transmitted to a memory 2 which retains the input information. The input memory 2 is connected to a disposition circuit 4. The disposition circuit 4 is preferably a microprocessor which is programmed to play a game in accordance with a predetermined payout schedule. The disposition circuit receives the input information from the input memory 2 and implements a program which will determine whether the article selected by the player is the winning article. The disposition circuit is controlled by a payout schedule recorded in the payout schedule memory 3. The disposition circuit employs a pseudo-random operation to determine which of the objects is the winning object, and the long-term payout ratio is determined by the payout schedule recorded in memory 3. Memories 2 and 3 are preferably solid state read-only memories (ROM). Other memory devices may be employed.

A display 6 visually indicates the payout schedule recorded in memory 3. In the apparatus shown in FIG. 1, there are eight possible objects which the player may choose to win the game. The payout ratio for each of the objects is displayed, for example, with a liquid crystal or light emitting diode display or an CRT monitor etc. The display is controlled by an indicator control circuit 5 which is connected to the disposition circuit where signals indicating the payout schedule are obtained.

After the disposition circuit 4 determines whether the object selected by the player and entered into the input 1 is the winning object, a signal is transmitted to the output 7. If the disposition circuit determines the object selected by the player to be the winning object, the output dispenses coins, tokens or other indicia of winning. If the object chosen by the player is not the winning object, the output 7 is not activated.

Figure 2:
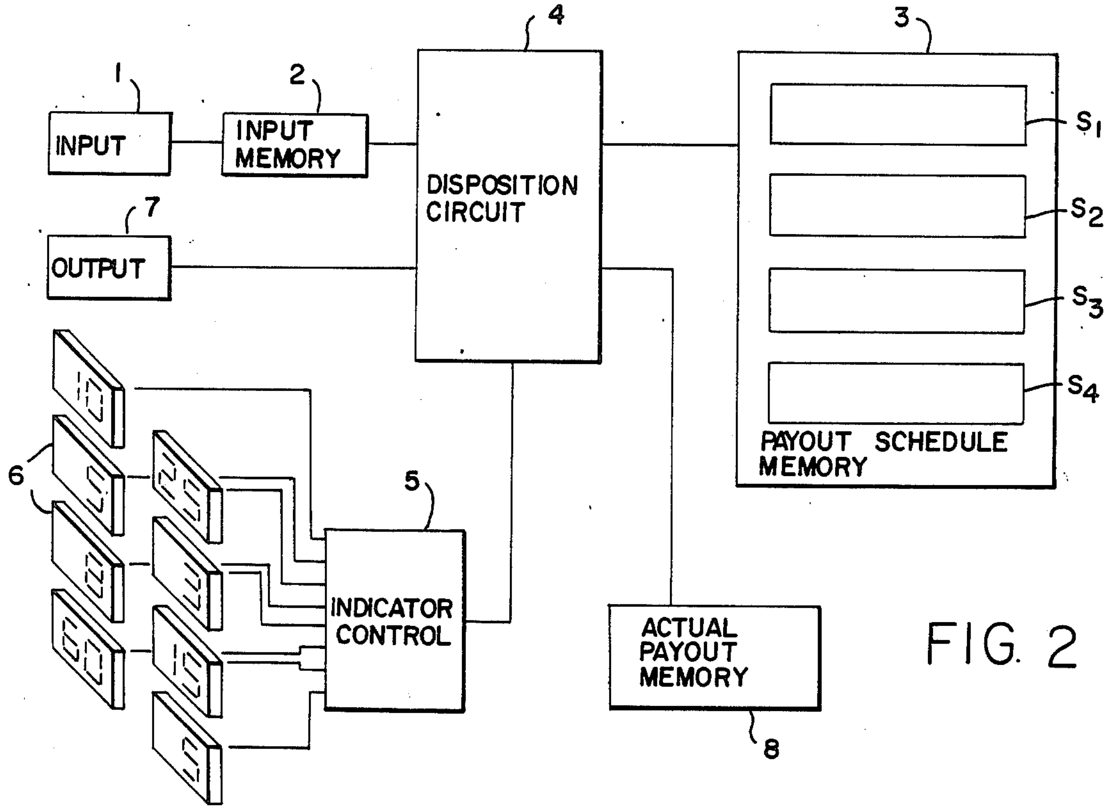
FIG. 2 is a schematic of an apparatus according to the invention.

The circuit of the invention is diagrammatically shown in FIG. 2. Those elements having a function similar to those shown in FIG. 1 have been given identical reference numerals. Thus, an input device 1 receives the input signal from the player and transfers this to the input memory 2. The inventive aspect of the apparatus shown in FIG. 2 is the payout schedule memory 3 wherein a plurality of payout schedules S1, S2, S3, and S4 are recorded. These payout schedules may, for example, be as shown in the following table:

| | Object | | | | | | | |
|---|---|---|---|---|---|---|---|---|
| Schedule | 1 | 2 | 3 | 4 | 5 | 6 | 7 | 8 |
| S1 | 8 | 4 | 6 | 40 | 20 | 2 | 11 | 4 |
| S2 | 10 | 5 | 8 | 60 | 25 | 3 | 15 | 5 |
| S3 | 12 | 6 | 9 | 70 | 29 | 4 | 19 | 6 |
| S4 | 14 | 8 | 11 | 85 | 34 | 5 | 22 | 8 |

It will thus be seen that the disposition circuit has a plurality of payout schedules available to it. Each of these payout schedules provides a different payout so that the payment to a player choosing a winning object is substantially different for each of the schedules.

A further feature of the apparatus according to the invention is the actual payout memory 8 which communicates with the disposition circuit 4. The actual payout memory 8 records the payout history of the machine and is connected to the disposition circuit so that the actual payout information may be acted upon by the disposition circuit 4.

Figure 3:
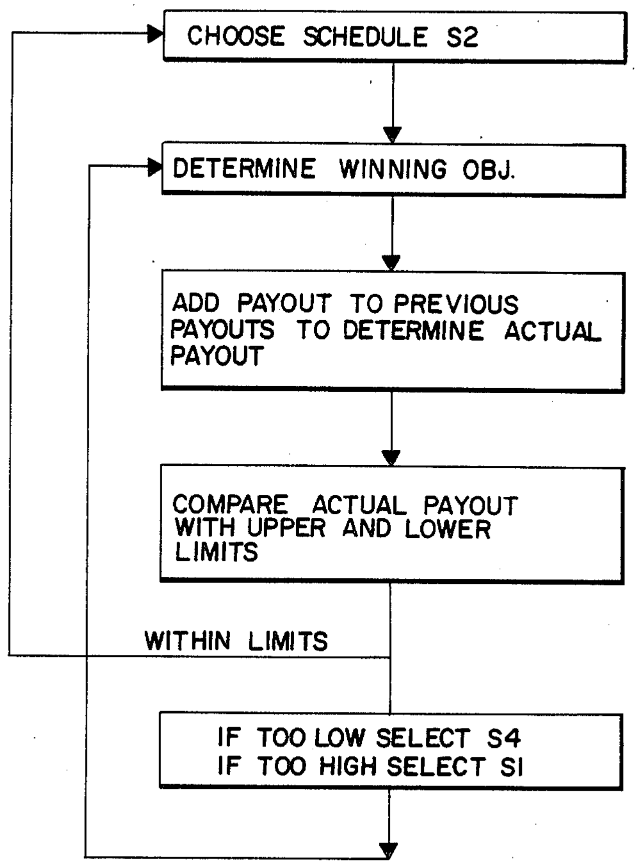
FIG. 3 is a flow chart for changing payout schedules.

The apparatus shown in FIG. 2 preferably operates as shown in FIG. 3 as follows: The payout schedules S1, S2, S3, and S4 as described above control a payout for eight objects. These payout schedules are recorded in payout schedule memory 3, and the disposition circuit normally chooses schedule S2. The schedule S2 is shown by the display 6 in FIG. 2, and this is illustrative of how the display 6 indicates any particular payout schedule governing the operation of the machine.

A player selects one of the objects 1 through 8 and designates it by the input device 1. The disposition circuit then plays the game according to a program built into it by the manufacturer and governed by a payout schedule S1–S4. If the object selected by the player is the winning object, coins, tokens, etc. are dispensed by the output device 7. After a payout is made, the result is added to previous results and recorded in actual payout memory 8. A predetermined payout limit is recorded in the disposition circuit by the owner or manufacturer of the machine, and when the actual payout exceeds the set payout limit, the disposition circuit 4 automatically selects another payout schedule S1, S3, or S4 to alter the actual payout of the machine. On the other hand, if the machine wins too much, a player will not be encouraged to continue playing the machine. Accordingly, a second limit is recorded in the disposition circuit so that when the actual payout is too low, the disposition circuit selects another of the payout schedules. In the payout schedules listed above, the payout percentage of S4 is higher than that of S2, and thus the disposition circuit will select schedule S4 when the actual payout is too low.

The manner in which a decision to change payout schedules is made will be apparent to one of ordinary skill in the art. Any of several techniques to update the actual payout rate and compare the new rate with a predetermined rate may be used, and the programming of such a process to direct the disposition circuit need not be disclosed here.

Thus, an improved apparatus has been disclosed wherein one of a plurality of payout schedules is selected to provide short and middle term payouts which provide encouragement to the player to continue playing and yet prevent a large loss to the owner of the apparatus. This apparatus meets with all rules of fair operation of gaming machines because the payout schedule actually employed by the disposition circuit is sensed by the indicator control and is displayed to the player.

The disposition circuit and the memories may be a single micro-electronic device. Alternatively the payout schedule memory 3 and the actual payout memory may be added to an existing apparatus.

Variations of the invention within the scope of the claims will be evident to those of skill in the art.

I claim:

1. Apparatus for providing a specific payout based on a predetermined payout schedule comprising input means for a player to select a selected object of a plurality of objects in a first payout schedule, disposition means for receiving a signal indicative of said selected object and determining whether the selected object results in a payout in accordance with said first payout schedule, means connected to said disposition means for determining the actual payout history of the apparatus, memory means connected to said disposition means for recording a plurality of payout schedules, each of said payout schedules having a payout for each of a plurality of objects, the total payout for each schedule being different from the total payout for each of the other schedules, display means for showing each payout corresponding to each object in a present payout schedule, said disposition means comparing said actual payout history with a predetermined limit and replacing said first payout schedule with a second payout schedule if said actual payout history exceeds said limit.

2. The apparatus of claim 1 wherein said disposition means comprises an electronic device which receives signals from said means for determining the actual payout history.

3. The apparatus of claim 2 wherein said means for determining includes memory means for receiving payout data and calculating said actual payout history.

4. The apparatus of claim 3 wherein said memory means for recording a plurality of payout schedules is a solid state read-only memory.

5. The apparatus of claim 4 wherein said memory means for receiving payout data is a solid state.

6. A method of controlling an amusement device which selects a winning object and makes an actual payout in accordance with a payout schedule, comprising the steps of determining the actual payout history of said device, comparing said actual payout history with predetermined limits, storing a plurality of payout schedules in a memory, and selecting a payout schedule from said plurality of payout schedules stored in said memory in accordance with said comparison.

7. The method of claim 6 wherein said step of determining the actual payout history includes accumulating the amounts of actual payouts in a memory and calculating an actual payout ratio.

8. The method of claim 7 further comprising the step of visually displaying the selected payout schedule.

* * * * *